July 15, 1941.  R. B. MUFFETT  2,249,297

ANTIBACKLASH DEVICE FOR FISHING REELS

Filed Aug. 1, 1939

Robert B. Muffett, INVENTOR

BY Victor J. Evans & Co.

ATTORNEYS

Patented July 15, 1941

2,249,297

UNITED STATES PATENT OFFICE 2,249,297

ANTIBACKLASH DEVICE FOR FISHING REELS

Robert B. Muffett, Merchantville, N. J.

Application August 1, 1939, Serial No. 287,796

2 Claims. (Cl. 242—84.5)

This invention relates to fishing reels, and its general object is to provide an anti-back lash device therefor, that sets up a constant yielding engagement with the reel spool, to allow for free running of the spool while casting, but provides sufficient braking pressure to prevent the spool from overrunning at the end of the cast, thus making it possible to properly cast under all conditions without a real snarl, as the line is held taut for the entire length of the cast.

A further object is to provide an anti-back lash device for reels that can be adjusted to vary its pressure against the spool and can be applied to reels of various types in an easy and expeditious manner, as the only change in the reel structure is the provision of an opening in one of the frame side plates.

Another object is to provide an anti-back lash device of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
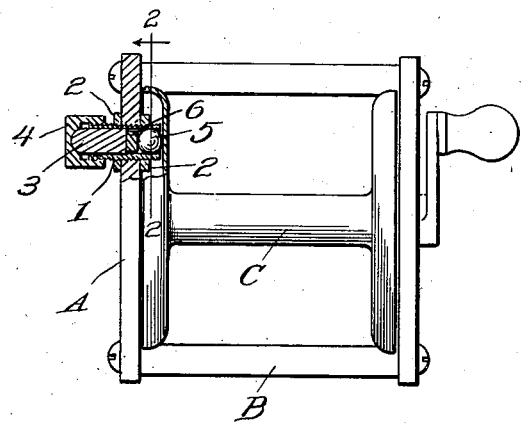
Figure 1 is a front view of a fishing reel, with one form of my anti-back lash device applied thereto and illustrated partly in section.

Referring to the drawing in detail, it will be noted that the reel shown is of a simple well known construction and includes a frame provided with side plates A connected together by spacing rods B. A handled spindle is journaled in the side plates and fixed to the spindle is a flanged spool C.

Figure 2:
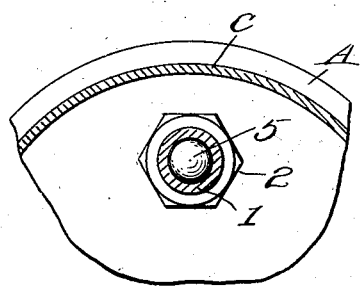
Figure 2 is a sectional view taken approximately on line 2—2 of Figure 1, looking in the direction of the arrows.

The side plate opposed to the plate having the handle engaged therewith, is provided with an opening for receiving my anti-back lash device which in the form as shown in Figures 1 and 2 includes a tubular housing 1 exteriorly threaded and mounted in the opening to extend upon opposite sides of the plate, as well as fixed accordingly by nuts 2 threaded on the housing and engaged with the plate.

Disposed within the housing to extend through the outer end thereof and mounted for slidable movement therein, is a substantially cylindrical follower member 3 preferably formed from leather and is provided with a rounded outer end for fitting engagement within a recess in the head of a cap 4 threaded on the outer end of the housing, as shown.

Mounted within the inner end portion of the housing 1 is a steel ball 5 held in constant engagement with the adjacent flange of the spool by a disk 6 preferably of elastic material such as rubber and disposed between the ball 5 and the inner end of the follower member 3, as clearly shown in Figure 1.

From the foregoing, and disclosure in the drawing, it will be obvious that the ball is not only held in constant yielding frictional engagement with the spool, but the pressure of the ball against the spool can be varied merely by adjusting the cap 4 with respect to the housing 1, that is the pressure will be increased when the cap is threaded inwardly and decreased when threaded outwardly.

Figure 3:
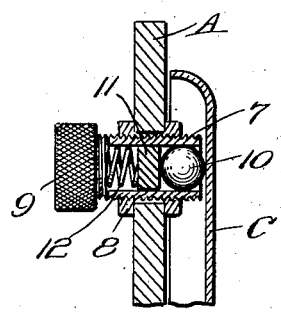
Figure 3 is a view partly in section illustrating another form of my device applied to a reel.

The form of Figure 3 likewise includes a tubular housing which for distinction is indicated by the reference numeral 7, the housing being exteriorly threaded and secured to the side plate of the spool frame by nuts 8, as well as has threaded on the outer end thereof a cap 9 which like the cap 4 is provided with a serrated outer surface. A steel ball 10 is likewise provided in this form, for engagement with the spool flange and mounted in the housing 7 in engagement with the ball 10 is a disk 11 preferably formed from leather, therefore the disk 11 differentiates from the disk 6, merely by the fact that they are made from different material. However, in place of the cylindrical follower member 3, the form of Figure 3 includes a coil spring 12 having its end convolutions engaged with the disk 11 and the inner face of the cap 9, respectively, for holding the ball 10 in constant yielding engagement with the head of the spool, as shown. It will be obvious in this form that the pressure of the spring is varied by threading the cap 9 inwardly or outwardly on the housing 7.

Figure 4:
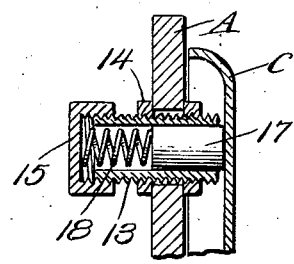
Figure 4 is a view partly in section of a further modified form.

The form of Figure 4 likewise includes a tubular housing 13 that is exteriorly threaded and secured in the opening of the frame plate, by nuts 14. A cap 15 is threaded on the outer end of the housing 13 and slidably mounted for disposal through the inner end of the housing for engagement with the adjacent flange of the spool is a substantially cylindrical friction plug 17 formed from any material suitable for the purpose, such as leather or the like, and is held in yieldable constant engagement with the head by a coil spring 18 disposed between the cap and the inner end of the plug.

While each form of my anti-back lash device allows for free running movement of the spool while casting, it will be obvious that sufficient pressure is provided to set up a braking action against the spool to prevent overrunning thereof, and that the amount of pressure can be readily varied, to meet existing conditions by the use of the cap which likewise acts to hold the housed elements within their housing.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a fishing reel, a flanged spool, a frame for the spool and having an opening in one side thereof, and an anti-back lash device comprising a tubular housing secured in and extending through the opening, a ball mounted for slidable movement in and through the inner end of the housing, resilient means within the housing for holding the ball in yielding frictional engagement with a flange of the spool, a disk of yieldable material between the ball and the resilient means, and a cap threaded on the housing and engaged with the resilient means for varying the pressure of the ball against the spool.

2. In a fishing reel, a flanged spool, a frame for the spool and having an opening in one side thereof, and an anti-back lash device comprising an exteriorly threaded tubular housing, nuts threaded on the housing and securing the same in and through the opening, a ball mounted in and through the inner end of the housing and engaged with a flange of the spool, a disk of yieldable material within the housing and engaged with the ball, a cap threaded on the outer end of the housing, and a coil spring between the disk and the cap for holding the ball against the spool.

ROBERT B. MUFFETT.